United States Patent [19]
Kokochak

[11] 3,973,526
[45] Aug. 10, 1976

[54] ROTARY COMBUSTION ENGINE

[75] Inventor: David G. Kokochak, Royal Oak, Mich.

[73] Assignee: General Motors Corporation, Detroit, Mich.

[22] Filed: June 16, 1975

[21] Appl. No.: 586,903

[52] U.S. Cl. .............................. 123/8.45; 418/183
[51] Int. Cl.² ......................................... F02B 53/00
[58] Field of Search ............ 123/8.45; 418/183, 186

[56] References Cited
UNITED STATES PATENTS 3,766,893   10/1973   Tredway et al. ................... 123/8.45
3,858,558   1/1975    Hart ................................... 123/8.13

*Primary Examiner*—Carlton R. Croyle
*Assistant Examiner*—Michael Koczo, Jr.
*Attorney, Agent, or Firm*—Ronald L. Phillips

[57] ABSTRACT

A rotary combustion engine having a rotor with separate ignition-exhaust ports which extend from one rotor flank to the same rotor side and open to a spark plug in the opposite stationary side wall during rotor rotation to provide for ignition of the charge in the connected chamber and after the expansion phase in addition open to an exhaust port in the same side wall to exhaust the products of combustion.

2 Claims, 4 Drawing Figures

ROTARY COMBUSTION ENGINE

This invention relates to a rotary combustion engine and more particularly to a rotary engine having a rotor with porting for both ignition of the charge in the chambers and later the exhaust of the products of combustion.

In the rotary combustion engines currently manufactured, side intake ports in the side housings are used in conjunction with the peripheral exhaust port in the rotor housing to minimize their overlap for good low speed performance. And in further minimizing overlap, the duration of the exhaust phase is shortened but with a sacrifice of burning efficiency. Furthermore, any discontinuity in the peripheral wall on which the apex seals slide, as for example the peripheral exhaust port and spark plug holes and a peripheral intake port, should that be the case, all present leakage paths between the adjoining chambers normally separated by the apex seals and place substantial stress on the apex seals since these seals are then not supported along their full length. In addition, when the spark plugs and the exhaust port are located in the rotor housing, there are imposed space limitations for the housing bolts which may not be best suited for the particular engine structure. The present invention is directed to providing relatively prolonged exhaust duration for better burning, greater control of overlap between exhaust and intake without compromising exhaust duration, and elimination of both increased apex seal stresses and the so-called "cross-talk" between the adjoining chambers resulting from the apex seals passing over holes in the internal peripheral wall of the rotor housing.

According to the present invention these advantages are accomplished with relatively simple structural modifications wherein one of the side walls opposite one side of the rotor is provided with both an exhaust port and a spark plug while a single inlet port is provided in the other side wall opposite the other rotor side. Thus, the rotor housing has no exhaust port or spark plug hole in its inner peripheral wall. Instead the rotor has separate ignition-exhaust ports which each extend from one peripheral flank to the rotor side facing the exhaust port and spark plug. The ignition-exhaust ports are surrounded by seals mounted on this rotor side which ride on the adjacent side wall; and the ignition-exhaust ports, the intake port and the spark plug are located so that the spark plug is opened through the passing ignition-exhaust ports to ignite the charge in the connected chambers and after the expansion phase the exhaust port is then opened to the passing ignition-exhaust ports to exhaust the products of combustion from the chambers.

This invention relates to a new and improved rotary combustion engine.

Another object is to provide a rotary combustion engine having a rotor with porting that provides for both ignition of the charge in the chambers and thereafter exhaust of the products of combustion from the chambers.

Another object is to provide in a rotary combustion engine a rotor having separate ignition-exhaust ports that are effective to open a spark plug to the combustion chambers through one rotor side and thereafter exhaust the products of combustion in these chambers through the same rotor side.

These and other objects of the present invention will be more apparent from the following description and drawing in which:

FIG. 1 is an end view with one end housing removed of a rotary combustion engine constructed according to the present invention.

Figure 2:
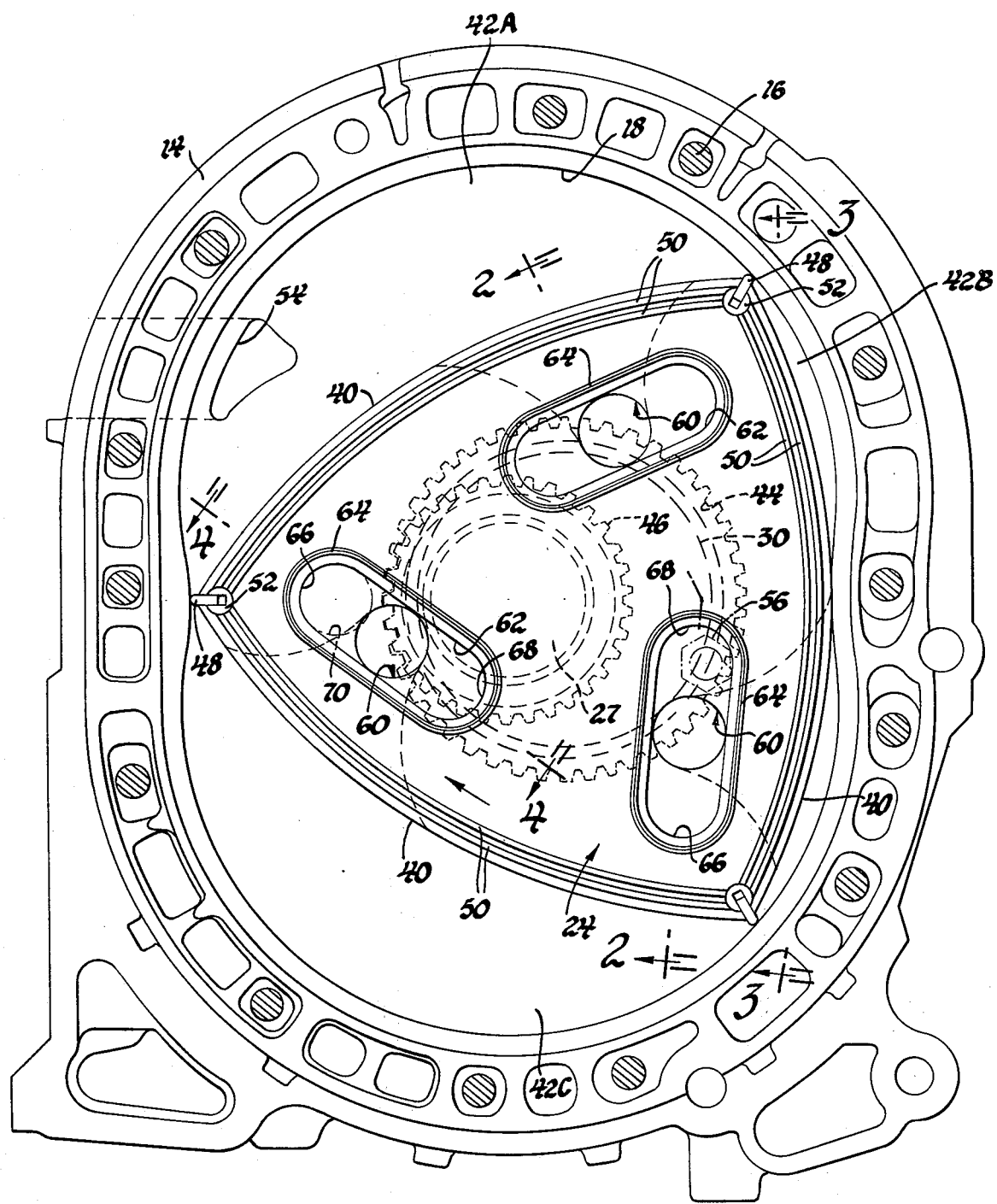
FIG. 2 is a view taken along the line 2—2 in FIG. 1.
Figure 2:
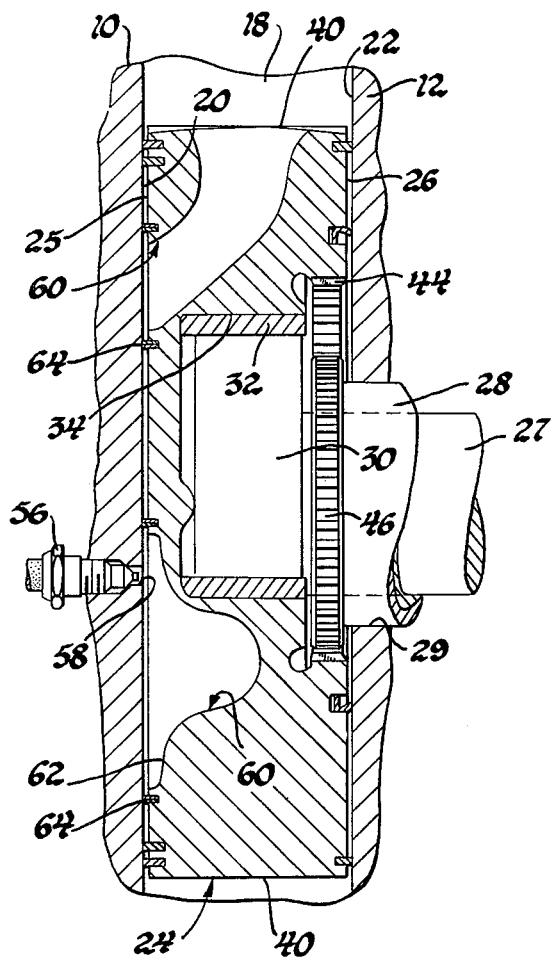
Figure 4:
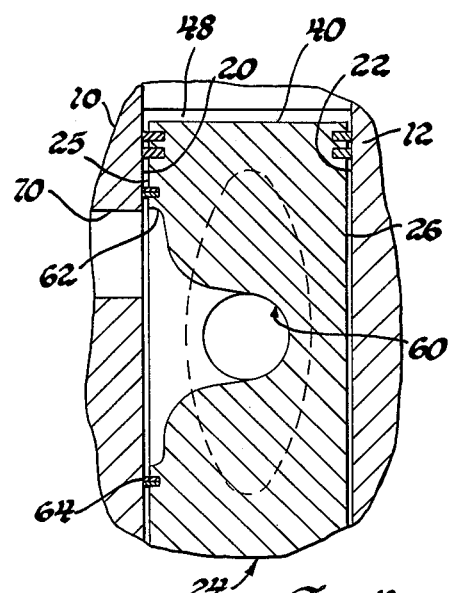
FIG. 4 is a view taken along the line 4—4 in FIG. 1.
Figure 3:
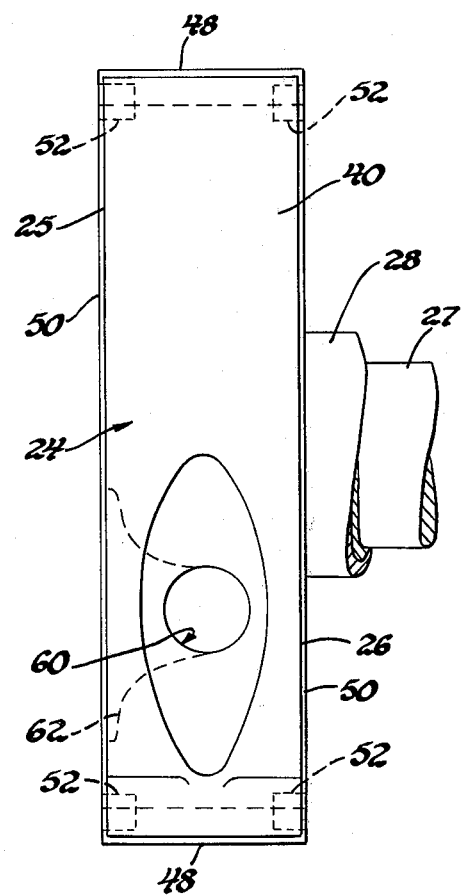
FIG. 3 is a view taken along the line 3—3 in FIG. 1.

The invention is disclosed in a rotary combustion engine generally of the planetary type which as shown in the drawing in a single rotor arrangement comprises a pair of end housings 10 and 12 and an intermediately located rotor housing 14 which are clamped together by bolts 16. The rotor housing has an inner peripheral wall 18 conforming to a curve parallel and outside of a two-lobe epitrochoid and cooperates with the oppositely facing side walls 20 and 22 of the respective end housings 10 and 12 to provide a cavity in which a generally triangularly shaped rotor 24 having parallel sides 25 and 26 is located. A crankshaft 27 is rotatably mounted in a collar 28 that is located in an opening 29 in side wall 22 and fixed to end housing 12. The crankshaft 27 has an eccentric 30 formed on one end which is located in the cavity and the rotor 24 is rotatably mounted on the eccentric by a sleeve bearing 32 received in a central blind bore 34 in rotor side 26. The rotor 24 further has three radially outwardly facing flanks 40 which cooperate with the inner peripheral wall 18 and the stationary side walls 20 and 22 to provide three expansible chambers 42 which are spaced about the rotor and move therewith and contract and expand twice during each rotor revolution for every three crankshaft revolutions. This phasing is enforced by an internal tooth rotary phasing gear 44 which is formed on rotor side 26 concentric with the rotor's central bore 34 and meshes with an external tooth stationary phasing gear 46 which is formed on the collar 28 and is concentric with the crankshaft journal. The rotary phasing gear 44 has one and one-half times the number of teeth as the stationary phasing gear 46 to enforce the proper phasing wherein intake, compression, expansion and exhaust occur in fixed relation to the stationary engine housing. For example, in the various housing regions as shown in FIG. 1, the chamber 42A is expanding in an intake phase to receive a charge while the chamber 42B is at top-dead-center following compression with the charge having been ignited and now about to expand this chamber and the chamber 42C has completed its expansion or power phase and is ready to be exhausted of its products of combustion.

Sealing of the chambers 42 is provided by an apex seal 48 which is mounted in a slot across each of the rotor apexes and spans the width of peripheral wall 18, one or more side seals 50 which are mounted in grooves in each of the rotor sides closely adjacent the flanks and a corner seal 52 which is mounted in a hole in each rotor side at each apex to sealingly link the side seals and the apex seal. The apex seals 48 are urged radially outward to continuously slide on the inner peripheral wall 18 and thus provide sealing between the adjoining chambers while the side seals 50 and corner seals 52 on each rotor side are urged axially outward to slide on the oppositely facing stationary side wall to provide sealing of the chambers about the rotor flanks.

In the rotary combustion engines currently manufactured it is typical practice to provide an intake port in each of the side walls for admitting an air-fuel mixture to the chambers as they expand, one or more spark plugs in the rotor housing for igniting the compressed mixture and an exhaust port through the rotor housing for exhausting the products of combustion after expansion.

However, according to the present invention there is provided a single intake port 54 in end housing 12 through the stationary side wall 22 which is opened and closed by rotor side 26 to deliver an air-fuel mixture from a carburetor and intake manifold arrangement (not shown) to the chambers 42 as they expand during the intake phase, the side seals 50 on this rotor side sliding over the intake port and providing sealing between the intake port and the chambers before and after intake. Instead of locating a spark plug in the rotor housing, there is provided a spark plug 56 which is mounted in the other end housing 10 and has its electrodes open to the cavity containing the rotor through a hole 58 in the side wall 20 opposite the side wall 22 with the intake port, this ignition hole location being such that it is always opposite the rotor side 25 during rotation. The spark plug 56 is opened to the passing chambers 42 by three separate ignition-exhaust ports 60 in rotor 24 which extend axially through rotor side 25 and then extend radially outwardly in an expanding elliptical shape through the respective rotor flanks 40 to thus open to the respective chambers 42. In addition, the ignition-exhaust ports 60 at the rotor side 25 each have an oval shaped mouth 62 that is elongated relative to rotor motion. Each of the mouths 62 is surrounded by seals 64 which are mounted in a groove in this rotor side extending about the mouth. The seals 64 are urged axially outward to slide on and sealingly engage the stationary side wall 20 to provide sealed connection of the ignition-exhaust ports 60 to the spark plug hole and also to an exhaust port in this side wall as described in more detail later. The relative location of the spark plug hole 58 and the mouths 62 of the rotor ports 60 and the direction and amount of elongation of the mouths are determined so that at a prescribed rotor angle before top-dead-center the spark plug hole 58 opens to the leading end 66 of the mouth 62 of the port 60 connected to the chamber then completing compression. Then as the rotor continues to turn the spark plug remains open to this ignition-exhaust port in the rotor until the trailing end 68 of the mouth reaches the spark plug which as shown in FIG. 1 may occur at a prescribed rotor angle after top-dead-center. Thus, the spark plug 56 is opened to the passing chambers by the respective ignition-exhaust ports 60 through a substantial rotor angle in the vicinity of top-dead-center and may be fired at any time during this interval to obtain optimum burning, the prescribed opening and closing angles, of course, being determined to provide at least a wide enough window to cover the required firing times.

Then to exhaust the products of combustion from the chambers following their expansion phase, there is provided an exhaust port 70 in end housing 10 which extends through the same stationary side wall 20 as the spark plug 56. The exhaust port 70 is located so as to open to the leading end 66 of the mouth 62 of the ignition-exhaust ports 60 immediately following chamber expansion and then remain open with continuing rotor rotation until the trailing end 68 closes off the exhaust port. Since the exhausting chamber is thus not directly open to an exhaust port in the chamber walls, the exhaust event is extendable by location, shape and size of the exhaust port 70 and the mouth 62 of the ignition-exhaust ports 60 to obtain relatively prolonged exhaust port opening without overlap between intake and exhaust as compared with a peripheral exhaust port. With a peripheral exhaust port the exhaust event would normally need to be shortened to accomplish zero overlap with a resulting sacrifice in burning. On the other hand, longer exhaust duration for better burning would then require a relatively large possibly undesirable overlap with a peripheral exhaust port. In the embodiment shown, both the firing and exhaust without overlap is accomplished with the leading end of each of the ignition-exhaust ports located at the associated leading rotor apex and the trailing end located about midway of the associated rotor flank while the exhaust port is provided with a round shape centered on the peripheral wall's minor axis. And it will also be apparent that the mouth 62 of the ports 60 can be extended in the trailing direction so that the trailing end 68 prolongs the exhaust opening even further to effect overlap should that be desired.

Thus, by providing an intake port in only one of the stationary side walls, a single exhaust port in the other stationary side wall, a spark plug in the same side wall as the exhaust port and simple porting in the rotor for both ignition and exhaust, it is possible to prolong exhaust without incurring overlap. Furthermore, there are neither spark plug openings nor exhaust or intake port openings in the peripheral wall and thus there has been effected elimination of both increased apex seal stresses and the so-called "cross-talk" between the adjoining chambers resulting from where apex seals pass over holes in this wall.

The above described embodiment is illustrative of the invention which may be modified within the scope of the appended claims.

I claim:

1. A rotary combustion engine comprising housing means having an internal peripheral wall and oppositely facing side walls, a rotor rotatably mounted in said housing means with sides facing said side walls and flanks facing said peripheral wall with apexes that remain adjacent said peripheral wall as said rotor rotates, said flanks and said walls cooperatively providing a plurality of chambers that are spaced about and move with said rotor while varying in volume, said housing means having an intake port in one of said walls openable by said rotor to said chambers for delivering a combustible gaseous mixture to said chambers as they expand in an intake phase, a spark plug mounted on said housing means having a spark electrode located in an opening in one of said side walls so as to always be opposite one of said rotor sides during rotor rotation, an exhaust port located in said one side wall so as to also always be opposite said one rotor side during rotor rotation, and said rotor having separate ignition-exhaust ports extending from said flanks to said one rotor side in locations so that said spark electrode is opened by said ignition-exhaust ports to ignite the mixture in the respective chambers following their contraction in a compression phase whereupon they expand in an expansion phase and also so that said exhaust port is opened by said ignition-exhaust ports to the respective chambers to expell the exhaust products therefrom as they contract in an exhaust phase.

2. A rotary combustion engine comprising housing means having an internal peripheral wall and oppositely facing side walls, a rotor rotatably mounted in said housing means with sides facing said side walls and flanks facing said peripheral wall with apexes that remain adjacent said peripheral wall as said rotor rotates, said flanks and said walls cooperatively providing a plurality of chambers that are spaced about and move with said rotor while varying in volume, said housing means having an intake port in one of said walls openable by said rotor to said chambers for delivering a combustible gaseous mixture to said chambers as they expand in an intake phase, a spark plug mounted on said housing means having a spark electrode located in an opening in one of said side walls so as to always be opposite one of said rotor sides during rotor rotation, an exhaust port located in said one side wall so as to also always be opposite said one rotor side during rotor rotation, said rotor having separate ignition-exhaust ports extending from said flanks to said one rotor side, and said ignition-exhaust ports having mouths elongated relative to rotor rotation arranged in locations so that said spark electrode is opened by said ignition-exhaust ports through a substantial rotor angle to ignite the mixture in the respective chambers following their contraction in a compression phase whereupon they expand in an expansion phase and also so that said exhaust port is opened by said ignition-exhaust ports to the respective chambers through a substantial rotor angle to expell the exhaust products therefrom as they contract in an exhaust phase.

* * * * *